(No Model.)
F. BECHT.
ROAD CART.
No. 348,447. Patented Aug. 31, 1886.
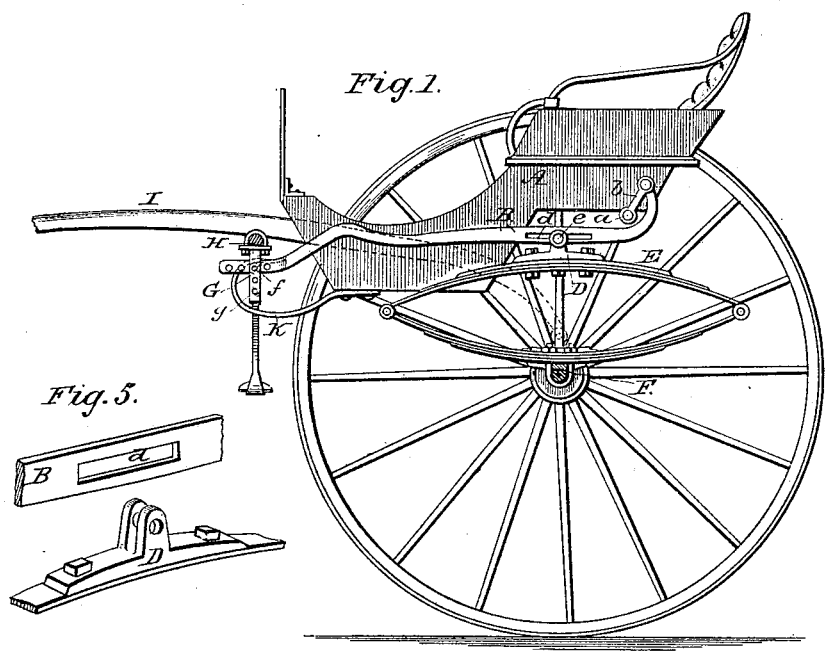
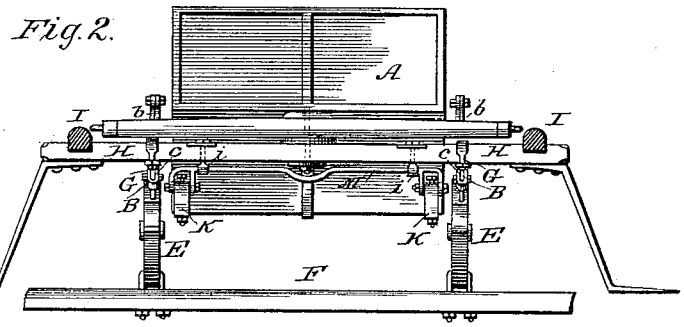
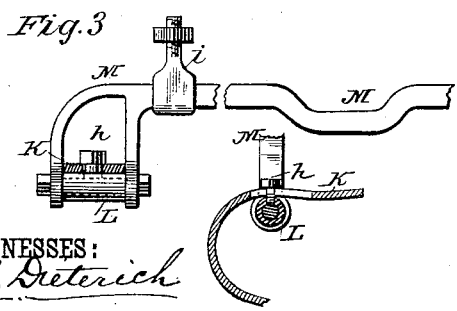
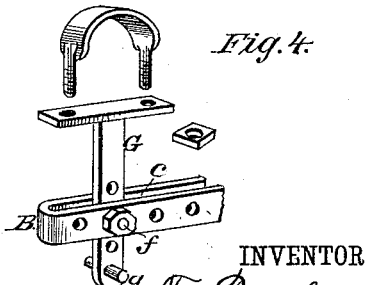
WITNESSES:
Fred G. Dieterich
Amos W. Hart
INVENTOR:
F. Becht
BY Munn & Co
ATTORNEYS.

UNITED STATES PATENT OFFICE.

FRANK BECHT, OF COLONA, ILLINOIS.

ROAD-CART.

SPECIFICATION forming part of Letters Patent No. 348,447, dated August 31, 1886.

Application filed January 23, 1886. Serial No. 189,548. (No model.)

*To all whom it may concern:*

Be it known that I, FRANK BECHT, of Colona, in the county of Henry and State of Illinois, have invented a new and useful Improvement in Road-Carts, of which the following is a description.

My invention is an improvement in the class of two-wheeled vehicles known as "road" or "village" carts.

The object of my invention is twofold—namely, to render such vehicles more comfortable for the occupant, also more easy for the horse, and this I accomplish by the construction and combination of parts hereinafter described and claimed.

In the accompanying drawings, Figure 1 is a side view of my improved village cart. Fig. 2 is a front view, the shafts being in section. Figs. 3, 4, 5 are detail views.

The body A is supported at its rear end by a transverse rod, $a$, and swinging arms or cranks $b$, attached to the upwardly-curved ends of the side bars or levers, B, and the front end of said body is supported by curved springs, as will be hereinafter more particularly described. The levers B are curved slightly upward and then downward at their front ends, which are also slotted vertically, as shown at $c$ in Fig. 4. Near their rear ends said bars are provided with a longitudinal slot, $d$, through which pass bolts $e$ that pivot and secure them between the ears of shackles D, bolted to the upper sides of elliptical springs E. The latter rest on and are clipped to the axle F in the usual way. The slotted front end of each side bar, B, receives the pendent arm of a T-shackle, G, whose head is clipped to the cross-bar H of the shafts I. Both the said shackle G and the slotted portions $c$, of bars B have holes to receive bolts $f$, that secure them together and in adjustable relation. As shown, the bars B are adjusted as far forward and upward as practicable, and the body A is properly balanced for the usual conditions of use; but if a load be placed in its front end it would bear correspondingly heavy on the back of the horse, and to relieve the latter in such a case the bolts $f$ are removed and the bars B adjusted backward, thus shifting the center of gravity of the body A far enough to the rear to compensate for the location of its load. This adjustment is obviously permitted by the slots $d$ in the bars B. If the horse be large the front ends of bars are adjusted downward on shackle-bars G, and, conversely, they are shifted upward if the horse be small, in order to preserve the desired horizontality of the body. Thus the latter may be easily and quickly shifted forward or back, or its inclination changed, to suit conditions as to location of its load and the size of the horse.

In Fig. 4 the lower ends of shackle-bars G are shown provided with cross-pins $g$. These serve as safety-stops for side bars, B, in case the bolts $e$ should break or become detached. I provide the front ends of the plate springs K with slots, Fig. 3, to facilitate such adjustment. The rear ends of said springs are bolted to the under side of the body, and their upwardly and rearwardly curved front ends rest on rocking sleeves, and are clamped thereto by screws $h$, that pass through the said slots. Said sleeves rotate on a rod passing through pendent bifurcated ends of a rod, M, which is arranged horizontally in front of the body A, and attached to the shafts I by means of eye-bolts $i$, in which it is free to rock or turn on its axis—that is to say, it rocks correspondingly to the rod $a$, thus allowing an easy to-and-fro or longitudinal swinging motion of the body A. I term this bar an "equalizer." The springs relieve the body from the vertical motion ordinarily incident to motion of the horse.

What I claim is—

1. In a road-cart, the combination, with the springs E, body A, transverse rod $a$, and arms $b$, of the body-supporting side bars, B, arranged above the springs and having lengthwise slots $d$, and the shackles provided with pivots $e$, that project through said slots, as shown and described.

2. In a road-cart, the body-supporting side bars provided with lengthwise slots and made adjustable at their front ends, in combination with pivotal supports attached to the axle, substantially as shown and described.

3. In a road-cart, the combination, with the body-springs and shafts, of the lengthwise adjustable side bars made vertically adjustable at their front ends, as shown and described.

4. In a road-cart, the combination, with the body A and rocking rod M, having pendent arms, of the journals L, applied to the latter, the side springs, K, having lengthwise slots, and the clamp-screws $h$, all arranged as shown and described.

5. In a road-cart, the combination of the plate-springs, slotted as specified, with a rocking support, the body A, and side bars slotted, as specified, to permit adjustment of the body, as set forth.

6. In a road-cart, the combination of the side bars having slots in their front ends, and the shackles G, having the safety-stops, as shown and described.

FRANK BECHT.

Witnesses:
GEORGE BROWN,
ELMER HUMBERSTONE.